United States Patent
Jarvis et al.

(10) Patent No.: US 10,471,547 B2
(45) Date of Patent: Nov. 12, 2019

(54) ADDITIVE MANUFACTURING METHOD USING FOCUSED LIGHT HEATING SOURCE

(71) Applicant: European Space Agency, Paris (FR)

(72) Inventors: David John Jarvis, Voorschoten (NL); Wayne Eric Voice, Nottingham (GB)

(73) Assignee: European Space Agency, Paris (FR)

( * ) Notice: Subject to any disclaimer, the term of this patent is extended or adjusted under 35 U.S.C. 154(b) by 474 days.

(21) Appl. No.: 14/652,826

(22) PCT Filed: Dec. 21, 2012

(86) PCT No.: PCT/EP2012/076709
§ 371 (c)(1),
(2) Date: Jun. 17, 2015

(87) PCT Pub. No.: WO2014/094882
PCT Pub. Date: Jun. 26, 2014

(65) Prior Publication Data
US 2015/0328719 A1    Nov. 19, 2015

(51) Int. Cl.
*B23K 28/00* (2006.01)
*B23K 35/02* (2006.01)
(Continued)

(52) U.S. Cl.
CPC .......... *B23K 28/00* (2013.01); *B23K 35/0261* (2013.01); *B23K 35/284* (2013.01); *B23K 35/286* (2013.01); *B23K 35/30* (2013.01); *B23K 35/302* (2013.01); *B23K 35/3033* (2013.01); *B23K 35/3046* (2013.01);
(Continued)

(58) Field of Classification Search
CPC .. B23K 28/00; B23K 35/0261; B23K 35/286; B23K 35/284; B23K 35/3053; B23K 35/3033; B23K 35/30; B23K 35/302
USPC .............. 219/121.12, 121.6, 121.61, 121.65, 219/121.69, 121.76, 121.82
See application file for complete search history.

(56) References Cited

U.S. PATENT DOCUMENTS 4,203,021 A * 5/1980 Anderl ............... B23K 15/0013
219/121.12
4,323,756 A * 4/1982 Brown .................... B22F 3/006
219/121.66
(Continued)

*Primary Examiner* — Jimmy Chou
(74) *Attorney, Agent, or Firm* — Woodard, Emhardt, Henry, Reeves & Wagner, LLP

(57) ABSTRACT

The present invention relates to a method of manufacturing a component 1 by additive manufacturing. The method comprises providing a work surface 2 on which the component 1 is to be manufactured, and providing at least one deposition material 3 from which the component 1 is to be composed. The deposition material, typically in the form of wire, is advanced to a localized deposition area 4 where it is added to the component 1 being manufactured. The method further comprises focusing at least one light beam 5 of incoherent light emitted from at least one heating source 6 in the deposition area 4 so that the deposition material 3 is deposited for building up the component 1. At least one light focusing mirror 7 and/or lens 11 is used to focus the incoherent light in the deposition area 4. The invention further relates to the use of such a method in space, such as on a space station, on a space craft or on parabolic flights for testing.

17 Claims, 4 Drawing Sheets

(51) Int. Cl.
*B23K 35/28* (2006.01)
*B23K 35/32* (2006.01)
*B23K 35/30* (2006.01)
*B33Y 10/00* (2015.01)

(52) U.S. Cl.
CPC ........ *B23K 35/3053* (2013.01); *B23K 35/325* (2013.01); *B33Y 10/00* (2014.12)

(56) References Cited

U.S. PATENT DOCUMENTS

| | | | | |
|---|---|---|---|---|
| 5,155,330 A * | 10/1992 | Fratiello | ............... | B23K 9/1735 219/137 R |
| 5,408,065 A * | 4/1995 | Campbell | .......... | B23K 26/0884 219/121.6 |
| 5,477,025 A * | 12/1995 | Everett | ................ | B23K 26/144 219/121.63 |
| 5,552,675 A * | 9/1996 | Lemelson | ............... | C23C 14/30 219/121.12 |
| 5,558,666 A * | 9/1996 | Dewey | ..................... | A61B 18/203 606/10 |
| 6,103,988 A * | 8/2000 | Kim | ..................... | G02B 6/2551 219/121.63 |
| 6,143,378 A * | 11/2000 | Harwell | .................. | C23C 26/02 427/264 |
| 6,504,127 B1 * | 1/2003 | McGregor | ......... | B23K 26/0604 219/121.63 |
| 6,596,962 B2 * | 7/2003 | Haschke | ............ | B23K 26/02 219/121.61 |
| 6,862,490 B1 * | 3/2005 | Duignan | ........... | H01L 21/67028 219/121.6 |
| 7,168,935 B1 | 1/2007 | Taminger et al. | | |
| 7,586,061 B2 | 9/2009 | Hoebel et al. | | |
| 8,119,053 B1 * | 2/2012 | Bedal | ................ | B29C 67/0077 264/308 |
| 8,452,073 B2 * | 5/2013 | Taminger | .............. | H01J 37/304 218/136 |
| 8,461,474 B2 * | 6/2013 | Wollenhaupt | ...... | B23K 15/0086 219/121.14 |
| 8,481,885 B2 * | 7/2013 | Tsukamoto | ............ | B23K 26/24 219/121.6 |
| 8,506,836 B2 * | 8/2013 | Szuromi | ............... | B22F 3/1055 216/102 |
| 8,546,720 B2 * | 10/2013 | Lin | .................... | B23K 26/1429 219/121.46 |
| 8,592,715 B2 * | 11/2013 | Wang | .................. | B23K 9/091 219/121.64 |
| 8,681,923 B2 * | 3/2014 | Ashida | .................. | B23K 26/28 219/121.11 |
| 8,729,424 B2 * | 5/2014 | Lin | .......................... | B23K 9/16 219/121.6 |
| 9,764,415 B2 * | 9/2017 | Seufzer | .............. | B23K 15/0086 |
| 2001/0004290 A1 * | 6/2001 | Lee | ..................... | H04B 10/502 398/79 |
| 2001/0008230 A1 * | 7/2001 | Keicher | ............. | B01F 13/0255 219/121.63 |
| 2002/0101892 A1 * | 8/2002 | Ouchi | ..................... | G03F 7/706 372/38.01 |
| 2002/0117485 A1 * | 8/2002 | Jones | ................... | B23K 1/0018 219/121.64 |
| 2003/0111446 A1 * | 6/2003 | Troitski | ................ | B41M 5/267 219/121.69 |
| 2005/0208168 A1 | 9/2005 | Hickerson et al. | | |
| 2006/0000812 A1 * | 1/2006 | Weber | .................... | B23K 26/03 219/121.61 |
| 2006/0185473 A1 * | 8/2006 | Withers | .................. | B22F 3/008 75/10.13 |
| 2006/0219666 A1 * | 10/2006 | Shin | ........................ | B23H 7/08 219/69.12 |
| 2008/0029495 A1 * | 2/2008 | Emiljanow | ............ | B23K 26/03 219/121.61 |
| 2008/0173386 A1 * | 7/2008 | Clark | .................... | B22F 3/1055 156/73.1 |
| 2008/0245774 A1 * | 10/2008 | Kim | .................... | B23K 26/0093 219/74 |
| 2009/0188896 A1 * | 7/2009 | Khakhalev | ............ | B23K 9/125 219/74 |
| 2009/0315144 A1 * | 12/2009 | Wang | ................ | H01L 27/11507 257/532 |
| 2010/0070022 A1 * | 3/2010 | Kuehling | .................. | A61F 2/82 623/1.16 |
| 2010/0110406 A1 * | 5/2010 | Usui | .................... | G03F 7/70091 355/67 |
| 2010/0155374 A1 * | 6/2010 | Rabinovich | ........ | B23K 15/0086 219/121.14 |
| 2010/0208242 A1 * | 8/2010 | Mart Nez | ............ | G01B 21/085 356/72 |
| 2010/0284016 A1 * | 11/2010 | Teitell | ..................... | G01J 3/453 356/451 |
| 2011/0122381 A1 | 5/2011 | Hickerson et al. | | |
| 2011/0165340 A1 * | 7/2011 | Baumann | ............... | B22F 3/1055 427/532 |
| 2011/0240607 A1 * | 10/2011 | Stecker | ............... | B23K 15/0086 219/121.17 |
| 2011/0256512 A1 * | 10/2011 | Huang | .................... | A63G 31/08 434/34 |
| 2012/0111837 A1 * | 5/2012 | Al-Mostaneer | ...... | B23K 9/0284 219/73 |
| 2012/0193335 A1 * | 8/2012 | Guldberg | .............. | B22F 3/1055 219/137 R |
| 2012/0247541 A1 * | 10/2012 | Wootton | ........... | H01L 21/02532 136/251 |
| 2012/0267349 A1 * | 10/2012 | Berndl | ................ | B23K 26/03 219/121.65 |
| 2013/0008879 A1 * | 1/2013 | Bichsel | ................ | B22F 3/1055 219/121.14 |
| 2013/0020289 A1 * | 1/2013 | Peters | ...................... | B23K 9/04 219/121.6 |
| 2013/0120718 A1 * | 5/2013 | Chikaoka | ............. | G02B 26/101 353/85 |
| 2013/0136868 A1 * | 5/2013 | Bruck | ...................... | B05D 3/06 427/554 |
| 2013/0140278 A1 * | 6/2013 | Bruck | ..................... | B23K 25/005 219/73.11 |
| 2013/0220570 A1 * | 8/2013 | Sears | ........................ | B22C 9/04 164/34 |
| 2013/0316183 A1 * | 11/2013 | Kulkarni, Jr. | ........... | B23P 6/007 428/557 |
| 2014/0021171 A1 * | 1/2014 | Jerby | ..................... | B28B 1/001 219/76.1 |
| 2014/0035279 A1 * | 2/2014 | Narayanan | ........... | B23K 1/0056 285/288.1 |
| 2014/0042131 A1 * | 2/2014 | Ash | ....................... | B23K 1/0056 219/121.66 |
| 2014/0061165 A1 * | 3/2014 | Stempfer | .................. | B22F 3/1055 219/73.21 |
| 2014/0169981 A1 * | 6/2014 | Bales | ........................ | B22F 5/04 416/96 R |
| 2015/0027993 A1 * | 1/2015 | Bruck | .................... | B23K 26/32 219/73.2 |
| 2015/0165554 A1 * | 6/2015 | Voice | .................. | B23K 26/1476 219/74 |
| 2015/0209913 A1 * | 7/2015 | Denney | .............. | B23K 35/0272 219/76.14 |
| 2015/0275687 A1 * | 10/2015 | Bruck | .................... | B23P 6/007 277/345 |

* cited by examiner

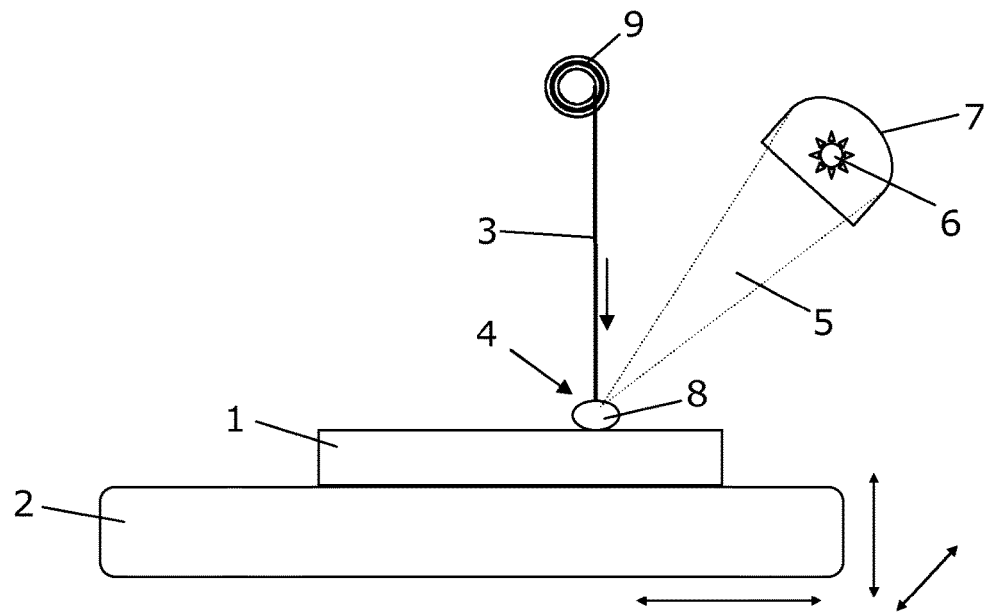
Fig. 1
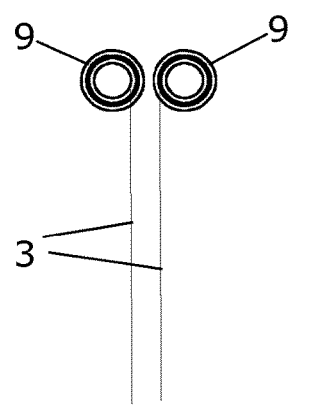    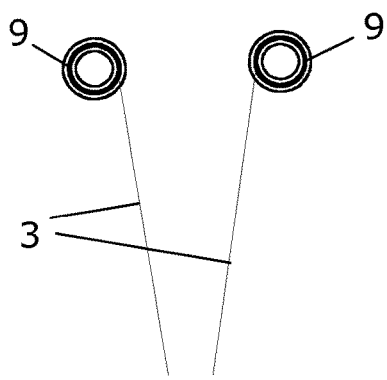
Fig. 2.a            Fig. 2.b

ADDITIVE MANUFACTURING METHOD USING FOCUSED LIGHT HEATING SOURCE

CROSS-REFERENCE TO RELATED APPLICATIONS

This application is the U.S. national stage application of International Patent Application No. PCT/EP2012/076709, filed Dec. 21, 2012, which is hereby incorporated by reference.

FIELD OF THE INVENTION

The present invention relates to manufacturing of components by additive manufacturing and in particular to methods comprising use of incoherent light to melt or soften the deposition material from which the component is to be composed.

BACKGROUND OF THE INVENTION

Currently used net-shape additive manufacturing techniques build alloy components layer by layer by melting powders or wires using a laser or electron beam power source. However, although very manipulative, these power sources are rather expensive and require high levels of maintenance and safety procedures. They are also mainly suited to manufacturing of small scale components because of the small spot size of the energy beam that is normally used for greater accuracy during the build process. Potential use of these methods for medium and large sized components would take long processing times and therefore are prohibitively expensive. Furthermore, these methods are not suitable for obtaining low surface roughness, and finishing machining is therefore normally required for most applications. Larger scale additive manufacturing processes use plasma arcs to melt the input consumable wire feedstock similar to welding operations. These methods produce preforms, i.e. crudely shaped billets that need to be subsequently machined to the component shape.

For use in space, these methods would be even more disadvantageous as these power sources for additive manufacturing are heavy and would significantly increase the payload particularly in terms of battery energy storage. Therefore, for space applications it is normally necessary to bring a whole range of tools and parts that might be needed, and this also increases the payload.

Hence, an improved additive manufacturing method would be advantageous, and in particular a more efficient and/or less expensive method would be advantageous.

OBJECT OF THE INVENTION

Thus, it is an object of the invention to provide a method of manufacturing a component by additive manufacturing which is more suitable for easy and fast manufacturing of medium and large sized components than prior art methods.

It is another object of the invention to provide a method of manufacturing a component by additive manufacturing which has lower levels of safety and/or maintenance requirements than prior art methods.

It is an object of some embodiments of the invention to provide a net-shape additive manufacturing method.

It is another object of at least some embodiments of the invention to provide a method of manufacturing a component by additive manufacturing which is particularly suitable for use in space.

It is a further object of the present invention to provide an alternative to the prior art.

In particular, it may be seen as an object of the present invention to provide a method of manufacturing a component by additive manufacturing that solves the above mentioned problems of the prior art.

SUMMARY OF THE INVENTION

Thus, the above described object and several other objects are intended to be obtained in a first aspect of the invention by providing a method of manufacturing a component by additive manufacturing, the method comprising:
  providing a work surface on which the component is to be manufactured,
  providing at least one deposition material from which the component is to be composed,
  advancing the deposition material to a localized deposition area where it is added to the component being manufactured,
  focusing at least one light beam emitted from at least one heating source in the deposition area so that the deposition material is deposited for building up the component, and
  mutually moving the work surface and/or the at least one light beam and the deposition material in a way that results in the additive manufacturing of the component,
the method being characterized in that the at least one heating source emits incoherent light, and in that at least one light focusing mirror and/or lens is used to focus the incoherent light in the deposition area.

By "deposition material" is meant the consumable material from which the component is to be made. As will be described below, for the present invention this material is preferably provided in wire form.

The deposition area is the area where the depositing of the deposition material onto the component takes place. The actual extension of this area may not be sharply delimited e.g. because the heating may influence the material in a larger area than what is directly hit by the focused light beam. How large an area that becomes hot enough to be influenced is material dependent. Furthermore, in embodiments where the deposition material is caused to melt, the melted material may also spread over a larger area than that directly hit by the focused light beam.

In some embodiments of the invention, the at least one heating source is one or more high power electrical lamps. By "high power" is meant that it must provide enough energy so that the focused light is intense enough to soften or melt the deposition material to the desired extent. The necessary power for a given application thus depends both on the deposition material used and on the design of the system of the at least one light focusing mirror and/or lens. The wattage of each lamp will typically be in the order of 200 to 1000 W, and typically a plurality of light focusing mirrors and/or lenses are used.

The at least one light focussing mirror would typically be parabolic or ellipsoidal, but it could also be other shapes, such as Fresnel reflectors.

In alternative embodiments of the invention, the at least one heating source is one or more optical and/or infrared light emitting diodes, LEDs. The power of such LED panels will typically be in the order of 200 to 1000 W. Some advantages of these embodiments are a relatively low price and that the LEDs are easy to replace if necessary. It would in principle also be possible to use both high power electrical lamps and LEDs in one system if desired.

The at least one focused light beam may have a spot size of 0.5 to 4 mm in the deposition area, such as in the order of 1 to 2 mm. This is in between the normally less than 0.1 mm for laser and electron beams or greater than 5 mm for plasma arc methods. This spot size and heat input has been found suitable for melting metal wire for the production of net-shape medium and large size engineering components.

The method is particularly useful for medium and large sized engineering components. The dimensions will typically be from 200 mm to many meters in length with cross sections typically being greater than 5 mm. Such large components would take far too long to manufacture by use of laser and electron beam methods.

In preferred embodiments of the invention, the deposition material is at least one wire. However, it could alternatively be powder fed to the deposition area by pneumatic feeding via a nozzle. By using wires, the deposition material itself is self-supporting in solid form and can thus be gripped and forwarded by mechanical means, such as reels or pinch rollers driven by motors. The wire is typically melted onto the component being manufactured to incrementally form the component by traversing it in x, y and z directions beneath the focus of the light and wire feed.

The at least one wire may be fed from variable positions around the component being manufactured. This may be advantageous for complex geometries for which it is easier to move the wire than the component itself.

The at least one wire may be vertically fed towards the deposition area. Especially when a plurality of wires is used, it is easiest to have them vertically fed in parallel from the same port to simplify the logistics of moving the component being built to be at the focus of the feed of wires. By vertical is preferably meant perpendicular to the work surface.

The at least one wire may be made from one or more of the following materials: pure or alloyed aluminium, magnesium, titanium, beryllium, steel, nickel, cobalt, copper, as well as solder and brazing alloys.

In some embodiments of the invention, the deposition material is a plurality of wires made from different materials which can be fed independently and simultaneously to the deposition area to enable in-situ alloying. Such different materials may advantageously be constitutive metals. This means that a range of different elemental metal wires could be provided as feedstock to enable manufacture of components from any alloy selected to provide the required properties. A large store of different alloy wires would therefore be avoided which would be particularly advantageous for space applications where both transportation and storage is a great issue.

In embodiments of the invention using a plurality of wires, the wires may be fed to the deposition area from different orientations if desired. This may e.g. be desired if that means an easier way of temporarily storing the wires at different locations around the component.

In any of the embodiments described above, the light may be focused onto one or more of the following positions in the deposition area:
- an area of the component onto which material is to be deposited prior to deposition for pre-heating of the component, and
- the deposition material to be deposited for pre-heating a region of the deposition material prior to contact with the component.

By light is in this context meant in addition to the light used for the actual deposition of deposition material. Such pre-heating may be used to lower the thermal gradients so that the risk of thermal stresses in the component is minimised. The pre-heating may also result in softening or melting of a small region of the component and/or the at least one wire so that a better coherence between the already deposited material and the material being deposited is obtained. Furthermore, the pre-heating may cause cleaning of the surface prior to deposition.

The component being manufactured may be moved to variable positions along three-dimensional paths. Hereby the component can be made without the need to move the at least one wire and the at least one light focusing mirror and/or lens. The component is typically moved by moving the work surface on which it is being manufactured. The work surface may e.g. be moved by use of a robotic arm, or by having it arranged on a xyz-stage which can be moved e.g. by use of stepper motors.

The whole system including the feeding of the at least one wire and the movement of the work surface, and/or the lamp(s), and/or the mirror(s), and/or the lens(es) will typically be controlled by a computer system. The system can be fully automated, but it may also be semi-automatic so that some user input is needed as part of the process.

In some embodiments of the invention, the deposition material becomes a molten pool during deposition onto the component being manufactured. This molten pool will solidify onto the already manufactured part of the component. These embodiments which comprise providing enough energy to melt the material are particularly suitable when different wires are used to obtain in-situ alloying. The constitutive metals typically mix to the desired extent within the molten pool by convection.

In other embodiments of the invention, the deposition material remains solid and is deformed and then diffusion bonded or sintered onto the component being manufactured. This will be particularly advantageous if for some geometries parts of the components could only be manufactured by additively building up the component along non-horizontal surfaces thus increasing build versatility. It could also be used to include that the wire is deformed by impact with the already built part of the component to give full consolidation of the deposit material. This deformation would refine the microstructure to produce a tougher component.

In some embodiments of the invention, the deposition material becomes semi-solid or thixotropic during deposition onto the component being manufactured. Semi-solid is defined as a material state in which solid and liquid coexist. This allows possible moulding and shaping with an edge forming tool as will be described below.

For any of the embodiments described above, the manufacturing may take place within a vacuum or inert gas chamber. This will be advantageous for materials which would otherwise react in an undesired way with air or an atmosphere of protective gasses. The whole system could be arranged within the chamber, but it may also be possible to keep the heating source(s) and the at least one mirror and/or lens outside the chamber so that only a part of the at least one light beam enters the chamber. Hereby the chamber can be kept as small as possible.

An edge forming tool may be arranged adjacent to one or more outer surfaces of the component being manufactured to obtain a desired shape and/or surface roughness of outer surfaces of the component. Such a tool will typically have a plane surface facing the component so that a plane outer surface of the component is obtained. The edge forming tool is typically moved along the surface as the component is being build; it may e.g. be robotically moved. The edge forming tool may be pressed against the surface to press the deposited material at the outer surface of the component into the desired shape and surface condition. This is an effective way of obtaining a net-shape process instead of the traditional near-net-shape method of using laser or electron beam or plasma arc. With these traditional processes, a final machining will most often be necessary to ensure desired dimensions, shapes and/or surface roughness.

A second aspect of the invention relates to the use of a method as described above in space, such as on a space station, on a space craft or on parabolic flights for testing. Especially in zero gravity, the feeding of wires is easier than the feeding of powder, because the deposition material is moved in a controlled manner all the way to the deposition area.

By using a method according to the present invention, it will be possible to manufacture the components in space as and when they are needed rather than to transport a complete repository of tools and parts in case they might be urgently required. Hereby the payload can be significantly decreased. The present invention may therefore be particularly advantageous in space, such as on a space station, on a space craft or on parabolic flights for testing.

However, the invention may also be used on Earth. Here it may be an advantageous alternative to traditionally used additive manufacturing methods because of the low cost of the equipment and low maintenance net-shape manufacturing system for medium to large sized metallic components.

The first and second aspect of the present invention may each be combined. These and other aspects of the invention will be apparent from and elucidated with reference to the embodiments described hereinafter.

BRIEF DESCRIPTION OF THE FIGURES

The method of manufacturing a component by additive manufacturing according to the invention will now be described in more detail with regard to the accompanying figures. The figures show one way of implementing the present invention and is not to be construed as being limiting to other possible embodiments falling within the scope of the attached claim set.

FIG. 1 shows schematically the overall idea in the invention.

FIG. 2 shows two possible arrangements of two wires being fed towards the deposition area in FIG. 1. FIG. 2.*a* shows parallel feeding of the wires, and FIG. 2.*b* shows the two wires being fed from different angles.

DETAILED DESCRIPTION OF AN EMBODIMENT

Figure 3:
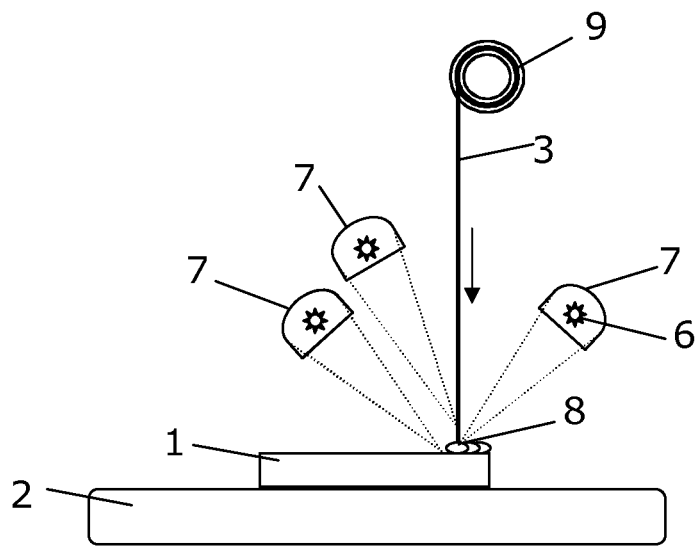
FIG. 3 shows schematically an embodiment where light beams are also focused onto the wire and onto the component being built at a position adjacent to the deposition area.

FIG. 1 shows schematically a method of manufacturing a component 1 by additive manufacturing according to the present invention. The component 1 is being manufactured on a work surface 2 which in the illustrated embodiment can be moved in three dimensions, as indicated by arrows, while the rest of the system is not moved. In the figure, the at least one deposition material from which the component is to be composed is arranged above the work surface. The deposition material 3 is shown in the form of one wire 3 in this figure. The deposition material is advanced to a localized deposition area 4 where it is added to the component 1 being manufactured. This deposition is obtained by focusing at least one light beam 5 emitted from at least one heating source 6 in the deposition area 4 so that the deposition material 3 is deposited for building up the component 1. In the illustrated embodiment, the work surface is moved in relation to the light beam and the deposition material along three-dimensional paths in a way that results in the additive manufacturing of the component 1.

A method according to the present invention is characterized in that the at least one heating source 6 emits incoherent light, and in that at least one light focusing mirror and/or lens is used to focus the incoherent light in the deposition area 4.

The at least one heating source 6 could e.g. be one or more high power electrical lamps. Alternatively it may be one or more optical or infrared LEDs. In the figure only one heating source 6 and one parabolic mirror 7 is shown for illustrative purposes only.

The at least one light beam 5 being emitted from the heating source 6 is preferably focused to have a spot size of 0.5 to 4 mm, such as 1 to 2 mm, in the deposition area 4. This size has been found to be appropriate to soften or melt the desired amount of deposition material 3. The figure shows a molten pool 8 of deposition material 3 on the component 1 being manufactured. When the manufacturing method is performed in space, the molten pool 8 will not be affected by gravity, and it will therefore be possible to build on inclined surfaces.

In FIG. 1, the wire 3 is shown as being fed vertically towards the deposition area from a reel 9 above the work surface 5. However, as described above it may also be fed from variable positions around the component 1 being manufactured. In both embodiments the advancement may involve robotic feed or motor driven reels or pinch rollers (not shown). Possible methods of advancing wires in a controlled manner will be well known to a person skilled in the art.

As shown in FIG. 2, the deposition material may also be a plurality of wires 3. They are shown in FIG. 2.*a* as being fed in parallel which is considered to be the easiest to control. However, they may also be fed towards the deposition area 4 from different angles, e.g. such as shown in FIG. 2.*b*. The plurality of wires 3 may be made from different materials which can be fed independently and simultaneously to the deposition area 4 to enable in-situ alloying. It will e.g. be advantageous to use a range of different elemental metal wires 3 as feedstock to enable manufacture of components 1 from any alloy selected to provide the required properties for a given component 1 and application. The number of wires 3 will then not necessarily be two; this number is shown in the figures for illustrative purposes only.

FIG. 3 shows schematically an embodiment of the invention, where in addition to the light used for the depositing itself, light is also focused onto one or more of the following positions in the deposition area 4: an area of the component 1 onto which material is to be deposited prior to deposition for pre-heating of the component 1, and the deposition material 3 to be deposited for pre-heating a region of the deposition material 3 prior to contact with the component 1. In the same manner, light beams 5 from more heating sources 6 can also be focused on the deposition area 4 if desired or needed, e.g. for a deposition material 3 having a high melting temperature.

Figure 4:
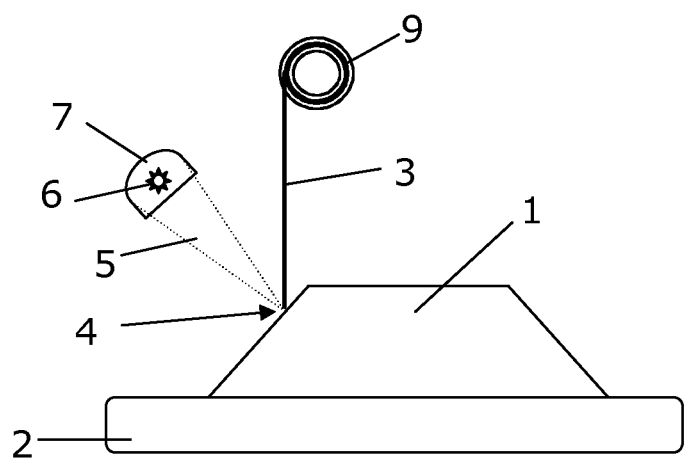
FIG. 4 shows schematically how the method can be used to deposit material at inclined surfaces.

In some embodiments of the invention, the deposition material 3 remains solid and is deformed and then diffusion bonded or sintered onto the component being manufactured. This is shown schematically in FIG. 4 illustrating how the method can be used to manufacture an inclined surface. By having the deposition material 3 remaining solid, or possibly semi-solid or thixotropic, during deposition onto the component 1 being manufactured, it is easier to manufacture inclined surfaces. Alternatively, such inclined surfaces can be made with molten deposition material by having a working surface 2 which can be rotated so that the surface under construction can be kept horizontal.

Figure 5:
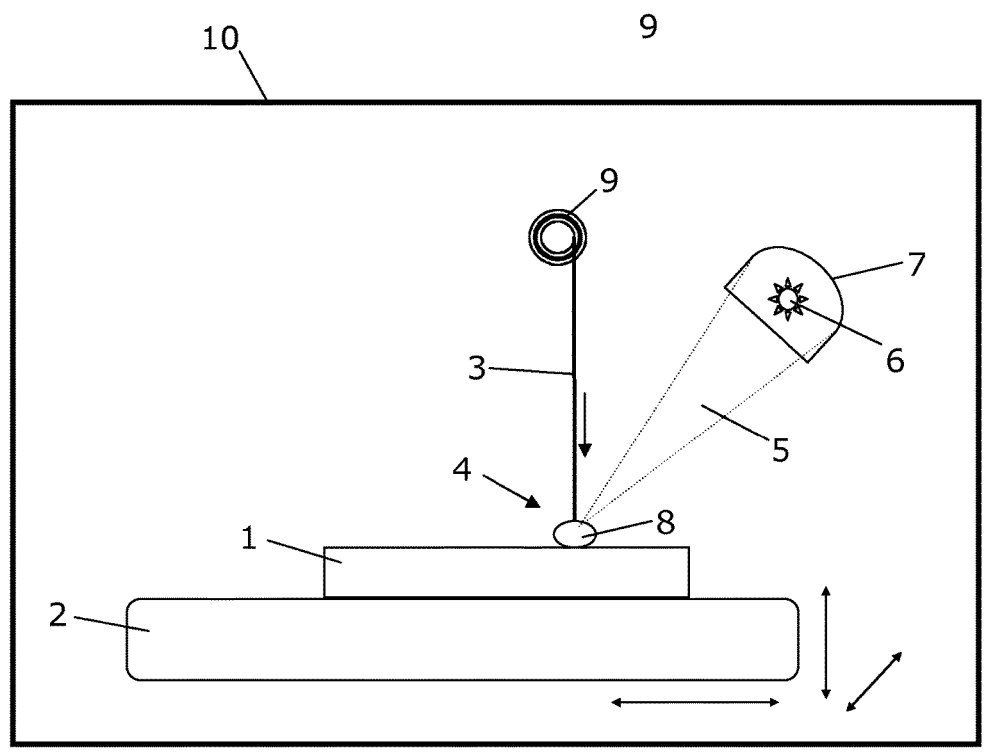
FIG. 5 shows schematically the embodiment in FIG. 1 arranged inside a vacuum or inert gas chamber.

For deposition materials 3 which react in an undesired way with air and possibly also with protective gasses, it will be advantageous to let the manufacturing take place within a vacuum or inert gas chamber 10 as shown schematically in FIG. 5. In the illustrated embodiment, the whole system is arranged inside a chamber 10. It may also be possible to have the at least one heating source 6 and the at least one mirror and/or lens arranged outside the chamber 10 provided that the at least one light beam 5 can pass through the wall of the chamber 10 in a predictable and appropriate way.

Figure 6:
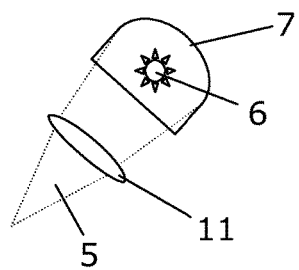
FIG. 6 shows schematically a light beam being focused by a combination of a parabolic mirror and a focusing lens.

FIG. 6 shows schematically a simple system in which the light beam 5 also passes a focusing lens 11 on its way towards the depositing area 4. In the figure one lens and one mirror is shown. However, the present invention includes any number of mirrors and/or lenses and combinations thereof which result in focused light with enough energy to soften or melt a given at least one deposition material in accordance with any of the embodiment described above and as covered by the claims.

Figure 7:
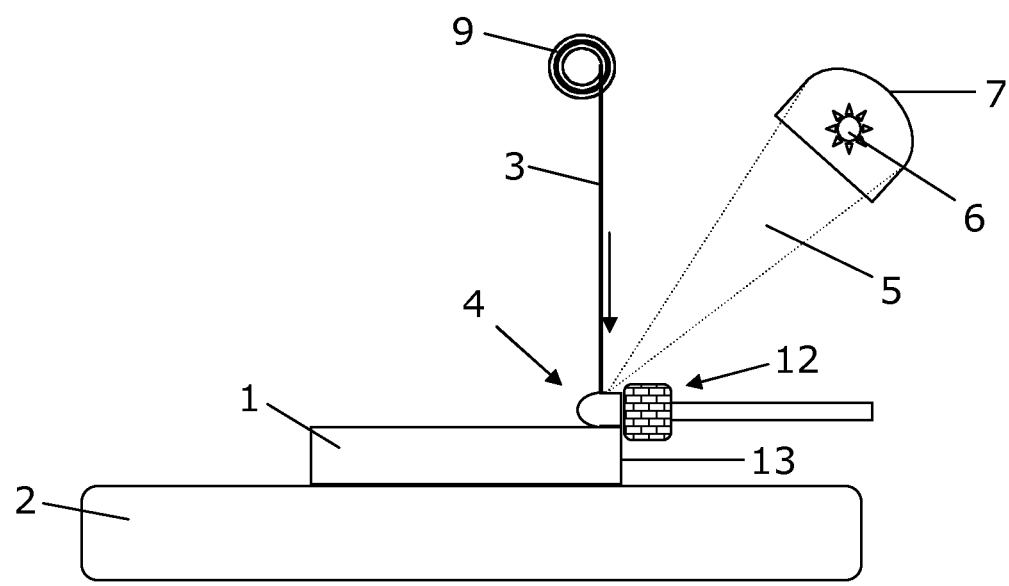
FIG. 7 shows schematically the use of an edge forming tool.

FIG. 7 shows schematically how an edge forming tool 12 can be arranged adjacent to outer surfaces 13 of the component 1 being manufactured to obtain a desired shape and/or surface roughness of the outer surfaces 13 of the component 1. When the deposition area 4 comprises a molten pool 8, the edge forming tool 12 is used to prevent the molten material from bulging over the edge of the component 1. When the deposition material is semi-solid, the edge forming tool 12 can be pressed against the outer surface to ensure the desired shape and/or roughness. The edge forming tool 12 should preferably be made from a temperature resistant material to ensure that it is the component 1 and not the tool that is deformed. The edge forming tool may e.g. be robotically manipulated to be present at the edge of the component 1. It should not be moved from an edge until the deposited material is solid enough to keep the obtained shape and surface condition.

Although the present invention has been described in connection with the specified embodiments, it should not be construed as being in any way limited to the presented examples. E.g. only wire as a depositing material has been described in details, but other forms of material are also considered to be covered by the general inventive idea. Such material may typically be powders being fed towards the deposition area, typically by pneumatic feeding via a nozzle.

The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention.

Furthermore, individual features mentioned in different claims, may possibly be advantageously combined, and the mentioning of these features in different claims does not exclude that a combination of features is not possible and advantageous.

The invention claimed is:

1. A method of manufacturing a metallic component by additive manufacturing, the method comprising:
    providing a work surface on which the component is to be manufactured,
    providing at least one deposition material being at least one wire from which the component is to be composed,
    advancing the at least one deposition material to a localized deposition area where the at least one deposition material is added to the component being manufactured,
    focusing light emitted from at least one light source in the localized deposition area so that the at least one deposition material is deposited for building up the component, wherein the at least one light source is one or more high power electrical lamps or one or more Light Emitting Diodes (LEDs), wherein the at least one focused light has a focused spot size of between 0.5 to 4 mm in the localized deposition area, and
    mutually moving the work surface and/or the focused light and the at least one deposition material in a way that results in the additive manufacturing of the component,
    the method being characterized in that the at least one light source emits incoherent light, and in that at least one light focusing mirror and/or lens is used to focus the incoherent light in the localized deposition area,
    wherein the at least one wire comprises a material selected from the group consisting of pure aluminium, alloyed aluminium, magnesium, titanium, beryllium, steel, nickel, cobalt, copper, solder, brazing alloys and alloys of these materials.

2. The method of manufacturing a component by additive manufacturing according to claim 1, wherein the at least one wire is fed from variable positions around the component being manufactured.

3. The method of manufacturing a component by additive manufacturing according to claim 1, wherein the at least one wire is vertically fed towards the localized deposition area.

4. The method of manufacturing a component by additive manufacturing according to claim 1, wherein the at least one deposition material is a plurality of wires made from different materials which are adapted to be fed independently and simultaneously to the localized deposition area to enable in-situ alloying.

5. The method of manufacturing a component by additive manufacturing according to claim 1, wherein the at least one light beam is focused onto one or more of the following positions in the localized deposition area:
    an area of the component onto which the at least one deposition material is to be deposited prior to deposition for pre-heating of the component, and
    the at least one deposition material to be deposited for pre-heating a region of the at least one deposition material prior to contact with the component.

6. The method of manufacturing a component by additive manufacturing according to claim 1, wherein the component being manufactured is moved to variable positions along three-dimensional paths.

7. The method of manufacturing a component by additive manufacturing according to claim 1, wherein the at least one deposition material becomes a molten pool during deposition onto the component being manufactured.

8. The method of manufacturing a component by additive manufacturing according to claim 1, wherein the at least one deposition material remains solid and is deformed and then diffusion bonded or sintered onto the component being manufactured.

9. The method of manufacturing a component by additive manufacturing according to claim 1, wherein the at least one deposition material becomes semi-solid or thixotropic during deposition onto the component being manufactured.

10. The method of manufacturing a component by additive manufacturing according to claim 1, wherein the manufacturing takes place within a vacuum or inert gas chamber.

11. The method of manufacturing a component by additive manufacturing according to claim 1, wherein an edge forming tool is arranged adjacent one or more outer surfaces of the component being manufactured to obtain a desired shape and/or surface roughness of outer surfaces of the component.

12. The method of manufacturing a component by additive manufacturing according to claim 1, wherein, while advancing the at least one deposition material, the work surface is located on a space station, on a space craft or on parabolic flights for testing.

13. The method of manufacturing a component by additive manufacturing according to claim 4, wherein light is focused onto one or more of the following positions in the localized deposition area:
   an area of the component onto which material is to be deposited prior to deposition for pre-heating of the component, and
   the at least one deposition material to be deposited for pre-heating a region of the at least one deposition material prior to contact with the component.

14. The method of manufacturing a component by additive manufacturing according to claim 13, wherein the component being manufactured is moved to variable positions along three-dimensional paths.

15. The method of manufacturing a component by additive manufacturing according to claim 14, wherein an edge forming tool is arranged adjacent one or more outer surfaces of the component being manufactured to obtain a desired shape and/or surface roughness of outer surfaces of the component.

16. The method of manufacturing a component by additive manufacturing according to claim 4, wherein the different materials are constitutive metals.

17. The method of manufacturing a component by additive manufacturing according to claim 1, wherein the at least one light beam generates heat in excess of the melting point of the selected wire in the localized deposition area.

* * * * *